INVENTOR.
JOHN P. LONGWELL

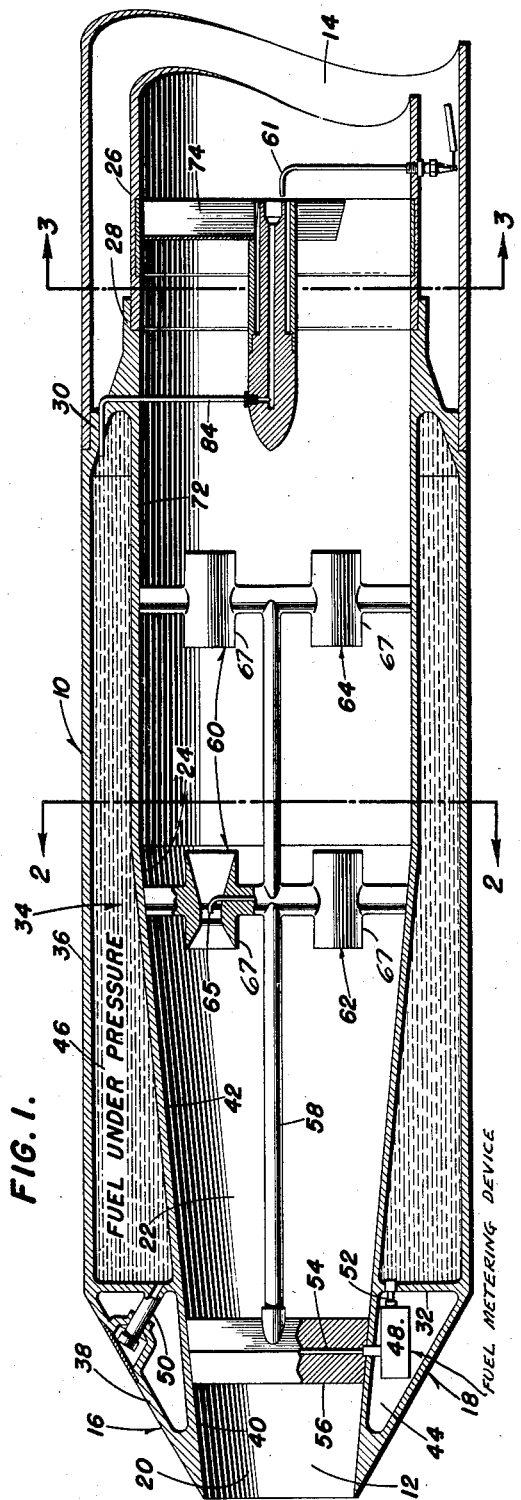
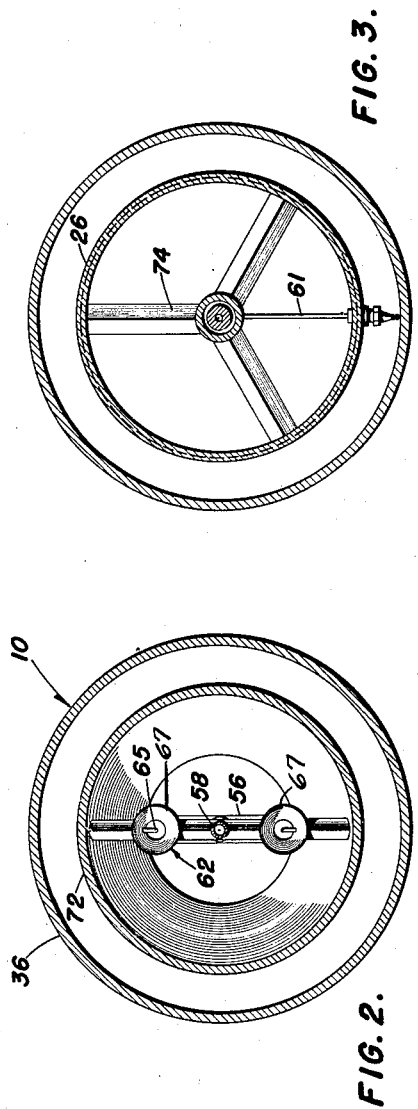

United States Patent Office 2,840,990
Patented July 1, 1958

2,840,990

MULTISTAGE FUEL INJECTION FOR RAM-JET COMBUSTOR

John P. Longwell, Westfield, N. J., assignor, by mesne assignments, to the United States of America as represented by the Secretary of the Navy Application July 17, 1952, Serial No. 299,443

7 Claims. (Cl. 60—39.72)

This invention relates generally to aerial missiles. More particularly, it relates to a multistage fuel injection arrangement for supersonic ram-jet engines.

In conventional ram-jet engines, in which the fuel is normally injected into the air stream through a series of nozzles at some distance upstream from the point of ignition, it has been observed that typical combustors had a periodic pressure fluctuation which increased markedly in amplitude immediately preceding the rich limit blowout. These fluctuations appeared to modulate the fuel rate, and thus prevented smooth combustion of petroleum hydro-carbon fuels mixtures.

It is the principal object of this invention, therefore, to provide a multistage fuel injection arrangement for supersonic ram-jet combustors.

Another object of the invention is to provide a multistage fuel injection arrangement for supersonic ram-jet combustors that makes it possible to attain smooth combustion of petroleum hydro-carbon fuels at mixtures near stoichiometric.

Still another object of the invention is to provide a fuel injection system for reducing the severity of pressure fluctuations in a ram-jet combustor by injecting the liquid fuel into the air stream by two sets of injection nozzles located different distances from the point of ignition of the fuel mixture.

It is another object of the invention to provide a multistage fuel injection arrangement in which there is less tendency for flame fluctuations to occur because of fluctuations in fuel rate.

And another object of the invention is to provide a fuel injection system which is efficient and reliable in operation, economical to manufacture, and easy to install in a ram-jet engine.

These and other objects of the invention will be apparent from the following description, accompanying drawings and claims.

The present invention is concerned with the injection of the hydro-carbon fuel into the airstream passing through the duct of a ram-jet engine at two different distances from the point of actual ignition of the fuel mixture. These fuel injection points are located a critical distance apart for best operating conditions. This is necessary in order that an average air-fuel mixture be maintained by averaging a too lean fuel mixture (caused by high pressure) from the upstream set of fuel nozzles with the rich mixture (caused by low pressure) from the downstream set of fuel nozzles. The fuel mixture from the two sets of nozzles is more nearly the desired average value. Thus, there is less tendency for flame fluctuation to occur because of fluctuations in the rate of fuel flow.

In a typical embodiment of the invention, therefore, the fuel is injected into the airstream passing through the duct of the ram-jet engine by at least two series of nozzles. These sets of nozzles are separated from each other by a critical distance, which varies from five (5) to twenty-four (24) inches, depending upon the characteristics of the burner being used and other factors which will be discussed presently.

In the drawings:

Fig. 1 is a fragmentary view partially in elevation of a portion of a ram-jet engine embodying the invention;

Fig. 2 is a cross-section on line 2—2 of Fig. 1;

Fig. 3 is a cross-section on line 3—3 of Fig. 1;

Figure 4:
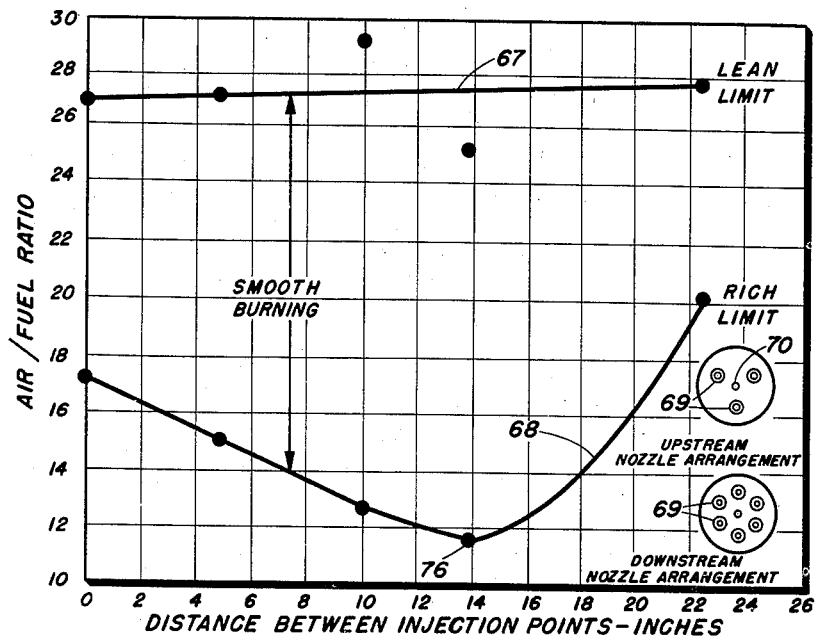
Fig. 4 illustrates curves showing the range of smooth burning as a function of distance between upstream and downstream sets of fuel injection nozzles in a ram-jet duct.

Prior to actually describing a typical embodiment of the invention, the problem which the present invention solves will be discussed.

In the development of combustors for supersonic ram-jet engines for use in aerial missiles, considerable difficulty has been encountered in attaining smooth combustion of petroleum hydro-carbon fuels, such as heptane and the like, at mixtures near stoichiometric. This difficulty seemed to be caused by periodic pressure fluctuations which became of sufficient amplitude to cause fluctuation in the fuel rate and to disrupt the continuity of the combustion.

It was actually observed, for instance, in typical combustors which were under development and in which the fuel was injected through a single set of nozzles all located the same distance upstream from the point of ignition, that a periodic pressure fluctuation in the approximate range of 120–150 cycles per second occurred. These pressure fluctuations appeared to increase greatly in amplitude immediately preceding the rich limit blowout. The result was that these pressure fluctuations caused undesirable changes in the fuel rate, and which, in turn, caused combustion of the fuel mixture to be irregular.

It was then ascertained, after considerable experimentation, that the severity of the pressure fluctuations could be materially lessened by injecting the fuel through at least two sets of nozzles placed at different distances from the actual point of ignition. In addition, it was observed that by injecting the fuel at two or more points from the point of ignition, it would be possible to burn much richer fuel mixtures.

The distance between the points of injection of the fuel into the airstream was also found to be critical. It should be pointed out that a mixture flowing from the upstream set of injection nozzles would be made too lean by a high pressure fluctuation, and would arrive at the downstream set of nozzles in a low pressure period. The average of the fuel quantities injected by each set of nozzles, arranged a critical distance apart, however, would give a fairly uniform mixture or composition. This will be described more fully presently.

Reference is now made to the drawings and a more detailed description of a typical embodiment of the invention.

In Fig. 1 there is shown an elongated tubular body of a ram-jet engine, which is designated generally by reference numeral 10. This jet engine is generally a part of an aerial missile, but is not necessarily limited thereto.

Body 10 is formed of heavy gauge sheet metal, and is open at both ends 12 and 14. The forward end of body 10 is partially enclosed by a nose assembly section 16, which includes a nose or ogive 18 made of plastic or metal. Section 16 can be made either integral with body 10 as shown, or as a separate section.

Ogive section 16 is formed with a central passageway 20 that is in open communication with a frusto-conical diffuser section 22. The energy of the high velocity air entering into diffuser section 22 is converted into pressure energy at the diffuser exit.

The rear end 24 of diffuser section 22 may be integral with a tailpipe section 72. Section 26 is an extension of tailpipe section 72 and is connected thereto by means of extension 28 from an annular flange 30.

A partition wall 32 divides an annular cavity 34 between walls 36, 38, 40 and 42 into two chamber sections 44 and 46. In section 44 there is housed a fuel metering device 48, while section 46 contains a source of liquid fuel, such as kerosene or the like, for the ram-jet engine. The liquid fuel is placed in chamber section 46 through a passageway 50. This fuel is maintained under a source of pressure by conventional means (not shown).

The liquid fuel passes from fuel chamber section 46 to the metering device 48 by means of a piping connection 52. After the fuel is metered, it flows through a passage 54 in strut member 56 and passage 58 to a fuel injection nozzle arrangement 60, where it is injected into the air stream by nozzles constituting said nozzle arrangement 60. The mixture is ignited further downstream by a remote controlled igniter 61.

The nozzle arrangement 60, with which this invention is particularly concerned, includes at least two sets or groups of nozzle arrangements 62 and 64. Each nozzle group comprises either individual nozzles, such as 65, or nozzle clusters made up of individual nozzles 65, or a combination of both of these. In addition, a suitably mounted venturi 67 is provided for each nozzle or cluster of nozzles 65. The nozzles are arranged to inject the fuel at the throats of the venturis 67 in a direction contra to the airstreams which are flowing through the venturis. These venturis 67 are provided in order that a more uniform distribution is obtained of the fuel and air which will improve the combustion efficiency of the system.

In a typical construction, the first group 62 of injection nozzles 65 is usually located near or at the exit 24 of diffuser section 22, while the second group 64 of nozzles 65 is located further downstream in tailpipe section 72, as will be described presently.

The number of individual nozzles in each nozzle group can vary from one (1) upwards. It is preferable, however, to have at least two or more nozzles in each group, with the forward nozzle group 62 containing more nozzles than the second nozzle group 64.

The nozzles of each group 62 or 64 can be arranged at equal radial distances from the longitudinal axis of the ram-jet engine body 10 and symmetrical about the longitudinal axis, as shown in Fig. 2, or in clusters of two or more nozzles, said clusters being located an equal radial distance from the longitudinal axis of body 10 and symmetrical about the longitudinal axis, or any combination of these arrangements. The nozzles in group 64 are preferably not arranged in clusters, but individually, as shown in Fig. 1.

As previously pointed out, the distance between each nozzle group 62 and 64 is of particular importance.

In Fig. 4, there are shown certain curves 67 and 68 plotted from data taken from actual tests illustrating the range of smooth burning. The upstream set 62 of fuel injection nozzles consisted of three ⅛" I. D. nozzles pointing upstream with a cylindrical shield 69 on each one, and an unshielded central nozzle 70, of the same dimension located along the longitudinal axis of the combustor. Nozzle 70 is also pointed upstream. The downstream set 64 of nozzles consisted of six ⅛" I. D. nozzles located as shown in Fig. 4. These nozzles were of the shielded type, and pointed upstream.

Curves 67 and 68 give the smooth burning limits as a function of distance between upstream and downstream nozzle sets 62 and 64, arranged as just pointed out. In a typical installation, the downstream nozzles 69 are mounted 1½" from the wall 72 of the combustor. It can be seen that there is little change in the lean limit, as shown by curve 67, but that the rich limit, as shown by curve 68, goes through a minimum at approximately 14 inches separation.

At blowout conditions, the velocity of the unburned fuel and air mixture is approximately 260 feet per second. If the pressure fluctuations occur at 120 cycles per second, which is usually the case with fuel injection at a distance of 20 inches from the upstream flame holder 74, the fuel would travel 2.16 feet per cycle. One-half wave length would be 1.08 feet or 13 inches, a distance very nearly the optimum separation of fuel injection points shown by point 76 in Fig. 4. Observation of the pressure fluctuations seemed to indicate that the two point systems of fuel injection, such as nozzle sets 62 and 64, seemed to have a higher frequency than when a single point of fuel injection is utilized, and the development of the large fluctuations preceding rich blowout takes place at righer mixtures.

Figure 5:
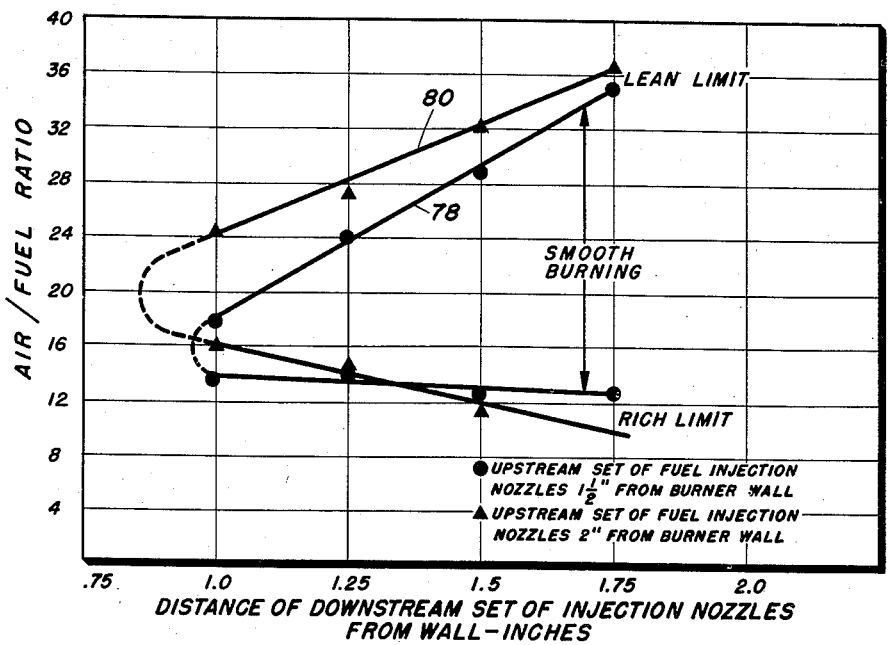
Fig. 5 illustrates curves showing the range of smooth burning as a function of distance of fuel injection nozzles from the wall of the ram-jet combustor.

Fig. 5 shows the limits of smooth burning plotted as a function of the distance of the downstream set 64 of fuel injection nozzles 69 from the combustor wall 72 for two different arrangements of the two point system of fuel injection.

The two combustor systems differed from each other in that the upstream set 62 of fuel injection nozzles 69 were different radial distances from the burner wall 72. Curve 78 shows the condition where the upstream set 62 of fuel injection nozzles 69 were located 1½" from the burner wall 72. Curve 80 shows the condition where the upstream set 62 of fuel injection nozzles 70 were 2 inches from the burner wall. The upstream set 62 of fuel injection nozzles 69 were located 18¾" from igniter 61, while the downstream set 64 of fuel injection nozzles 69 were located 8¾" from igniter 61. For both combustor systems, the range of smooth burning is very narrow when the downstream set 64 of injection nozzles 69 are near the wall, and the smooth range increases on both the lean and rich side as the injection nozzles are moved toward the longitudinal axis of the combustor. The effect of concentrating the fuel in the center of the combustor is well illustrated by these two curves 78 and 80. The combustor with the upstream set 62 of nozzles 69 closest to the wall will not burn as lean a mixture as the one with the upstream set 62 of nozzles 69 closest to the longitudinal axis or center of the combustor. The increase in the lean limit as the downstream set 64 of nozzles 69 are moved toward the center of the combustor is quite pronounced. The lean limit does not seem to be determined as much by the onset of resonance as by inflammability, and it appears, therefore, that for a given fuel, the lean limit is a criterion of the degree to which fuel is concentrated in the center of the combustor.

The rich limit, as shown in Fig. 5, is not so consistent in its behavior as the injection nozzle position is changed. In the case where the upstream set 62 of injection nozzles 69 are 1½" from the combustor wall 72, as shown by curve 78, there is little change of rich limit with downstream set 64 of nozzles 69's position, while with the upstream set 62 of nozzles 69 in two (2) inches from the combustor wall 72, there is a marked increase in the amount of fuel that can be burned without roughness. Other cases, for instance, have been observed in which the limiting air-fuel ratio goes through a minimum or increases as the downstream set 64 of nozzles 69 are moved towards the center of the combustor.

Recapitulating, an aerial missile having a ram-jet engine with the nozzle arrangement referred to above, and a launching propulsing carriage, is launched by means of the carriage from a plaform or the like (all of which are not shown). At a certain point along the trajectory, the carriage will have spent its power, and the ram-jet engine will then furnish the source of power for the missile.

Unmetered fuel from fuel chamber 46 passes into the metering arrangement 48 where it is metered. The metered fuel then passes through pipe lines 54 and 58 to the fuel injection nozzle arrangement 60, where it is injected into the air streams in the venturis 67 through the two sets of injection nozzles 62 and 64 in the required quantity to give the proper air-fuel ratio.

The fuel mixtures from the venturis 67 are then swept further downstream into the combustion chamber in the tailpipe section 26 of the ram-jet engine where they are ignited by the remote-controlled igniter 61. This igniter is fed with kerosene through a passage 84 from fuel chamber 46. Other types of igniter arrangements can be utilized.

The gases generated by the burning of the fuel mixture are then passed through an exit nozzle in the rear portion of tailpipe section 26 at a greater velocity than the entering stream of air, and are thus utilized to power the missile on its course.

In a general manner, while there has been disclosed what is deemed to be a practical and efficient embodiment of the invention, it should be well understood that the invention is not limited thereto as there might be changes made in the arrangement, disposition, and form of the parts without departing from the principle and spirit of the invention as comprehended within the scope of the appended claims.

What is claimed is:

1. In combination, an aerial missile having a body in the form of an elongated tubular duct, a diffuser and a combustor in said duct, a fuel source having a fuel chamber in said body, and nozzle means connected with said fuel chamber and communicating with said duct, said nozzle means being located upstream from said combustor, said nozzle means including an upstream set of fuel injection nozzles and a downstream set of fuel injection nozzles, and a venturi for each of said nozzles, said nozzles being arranged to inject said fuel into airstreams passing through said venturis at the throats thereof in a direction contra to the flow of said airstream through said venturis, said sets of nozzles being separated from each other by a distance approximately one-half the wavelength of the periodic pressure fluctuation in said combustor.

2. An arrangement as set forth in claim 1, wherein each nozzle set includes at least two nozzles.

3. In combination, an aerial missile having a body in the form of an elongated tubular duct, a frusto-conical diffuser and a combustor in said duct, a fuel source having a fuel chamber in said body, nozzle means connected with said fuel chamber and communicating with said duct, said nozzle means being located upstream from said combustor, said nozzle means including an upstream nozzle assembly having at least one cluster of fuel injection nozzles and a downstream nozzle assembly having at least one cluster of fuel injection nozzles, and a venturi for each injection nozzle, said nozzle assemblies being arranged so that said nozzles inject said fuel into airstreams passing through said venturis at the throats thereof in a direction contra to the flow of said airstreams therethrough.

4. An arrangement as set forth in claim 3, wherein said nozzle assemblies are separated by a distance approximately one-half the wave length of the periodic pressure fluctuation in said combustor.

5. In combination, an aerial missile having a body in the form of an elongated tubular duct, a frusto-conical diffuser and a combustor in said duct, a fuel source having a fuel chamber in said body, nozzle means connected with said fuel chamber and communicating with said duct, said nozzle means being located upstream from said combustor, said nozzle means including an upstream nozzle assembly having at least one cluster of fuel injection nozzles and one separate nozzle, and a downstream nozzle assembly having at least one cluster of nozzles and one separate nozzle, and a venturi for each of said nozzles, said nozzle means being arranged so that said nozzles therein inject said fuel into airstreams passing through said venturis at the throats thereof in a direction contra to the flow of said airstreams therethrough.

6. In an aerial missile including a ram-jet engine having a body in the form of an elongated tubular duct, a diffuser and a combustor in the duct, and a fuel source having a fuel chamber in said body; in combination with nozzle means connected with said fuel chamber and communicating with said duct, said nozzle means being located upstream from said combustor, said nozzle means including an upstream nozzle assembly having at least one fuel injection nozzle, and a downstream nozzle assembly having at least one fuel injection nozzle, and a venturi for each of said nozzles, said nozzle means being arranged so that said nozzles therein inject said fuel into airstreams passing through said venturis at the throats thereof in a direction contra to the flow of said airstreams therethrough.

7. An arrangement as set forth in claim 6, wherein said nozzle assemblies are separated from each other by a distance approximately one-half the wave length of the periodic pressure fluctuation in said combustor.

References Cited in the file of this patent

UNITED STATES PATENTS

| | | |
|---|---|---|
| 2,508,420 | Redding | May 23, 1950 |
| 2,518,000 | Goddard | Aug. 8, 1950 |
| 2,529,506 | Lloyd et al. | Nov. 14, 1950 |
| 2,540,594 | Price | Feb. 6, 1951 |
| 2,589,945 | Leduc | Mar. 18, 1951 |
| 2,563,024 | Goddard | Aug. 7, 1951 |
| 2,625,788 | Neikirk | Jan. 20, 1953 |

FOREIGN PATENTS

| | | |
|---|---|---|
| 439,805 | Great Britain | Dec. 6, 1935 |
| 981,045 | France | Jan. 10, 1951 |